United States Patent
Haranahalli Panchakshari

(10) Patent No.: US 12,344,229 B2
(45) Date of Patent: Jul. 1, 2025

(54) VEHICLE CONTROL SYSTEM

(71) Applicant: JAGUAR LAND ROVER LIMITED, Coventry (GB)

(72) Inventor: Bhanuprakash Haranahalli Panchakshari, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 239 days.

(21) Appl. No.: 17/998,558

(22) PCT Filed: May 13, 2021

(86) PCT No.: PCT/EP2021/062780
§ 371 (c)(1),
(2) Date: Nov. 11, 2022

(87) PCT Pub. No.: WO2021/229034
PCT Pub. Date: Nov. 18, 2021

(65) Prior Publication Data
US 2023/0174048 A1 Jun. 8, 2023

(30) Foreign Application Priority Data
May 13, 2020 (GB) ..................... 2007061

(51) Int. Cl.
*B60W 20/16* (2016.01)
*B60W 20/13* (2016.01)
(Continued)

(52) U.S. Cl.
CPC ............ *B60W 20/16* (2016.01); *B60W 20/13* (2016.01); *B60W 50/10* (2013.01); *F01N 3/023* (2013.01);
(Continued)

(58) Field of Classification Search
CPC ...... B60W 20/13; B60W 20/16; B60W 40/04; B60W 40/06; B60W 40/08;
(Continued)

(56) References Cited

U.S. PATENT DOCUMENTS 5,815,824 A 9/1998 Saga et al.
2006/0208169 A1* 9/2006 Breed ............... B60R 21/01536
250/221

(Continued)

FOREIGN PATENT DOCUMENTS

CN 110808053 A 2/2020
DE 102015116832 A1 4/2016
(Continued)

OTHER PUBLICATIONS

Combined Search and Examination Report under Sections 17 and 18(3) for Application No. GB2015645.1 dated Dec. 2, 2020.
(Continued)

*Primary Examiner* — Binh Q Tran
(74) *Attorney, Agent, or Firm* — Carlson, Gaskey & Olds, P.C.

(57) ABSTRACT

Aspects of the present invention relate to a control system for a vehicle (10) and an associated method of controlling a vehicle (10). The control system comprises one or more controllers, the control system being configured to: receive at least one identity signal indicative of an identity of a driver of the vehicle (10); determine a driver profile in accordance with a driver identity indicated by the or each identity signal; estimate a driver intent in accordance with the driver profile; and schedule a vehicle action in accordance with the driver intent.

20 Claims, 4 Drawing Sheets

(51) Int. Cl.
*B60W 40/06* (2012.01)
*B60W 50/04* (2006.01)
*B60W 50/08* (2020.01)
*B60W 50/10* (2012.01)
*B60W 50/14* (2020.01)
*F01N 3/023* (2006.01)
*F01N 3/08* (2006.01)
*F01N 3/10* (2006.01)

(52) U.S. Cl.
CPC ........... *F01N 3/0871* (2013.01); *F01N 3/101* (2013.01); *B60W 40/06* (2013.01); *B60W 2050/046* (2013.01); *B60W 50/08* (2013.01); *B60W 50/14* (2013.01); *B60W 2510/244* (2013.01); *B60W 2520/10* (2013.01); *B60W 2540/043* (2020.02); *B60W 2540/21* (2020.02); *B60W 2540/221* (2020.02); *F01N 2900/102* (2013.01); *F01N 2900/104* (2013.01); *F01N 2900/14* (2013.01); *F01N 2900/16* (2013.01); *F01N 2900/1614* (2013.01); *F01N 2900/1624* (2013.01)

(58) Field of Classification Search
CPC ......... B60W 40/0809; B60W 40/0863; B60W 40/09; B60W 50/0097; B60W 50/08; B60W 50/10; B60W 50/14; B60W 2050/0029; B60W 2050/046; B60W 2510/244; B60W 2520/10; B60W 2540/043; B60W 2540/21; B60W 2540/221; B60W 2040/0809; B60W 2556/50; B60W 2540/30; B60W 2540/00; B60W 2552/20; B60W 2552/25
See application file for complete search history.

(56) References Cited

U.S. PATENT DOCUMENTS

| | | | |
|---|---|---|---|
| 2010/0043404 A1* | 2/2010 | Hebbale | F01N 9/00 60/274 |
| 2011/0172864 A1* | 7/2011 | Syed | B60K 6/445 180/65.265 |
| 2015/0369197 A1 | 12/2015 | Cunningham et al. | |
| 2018/0340784 A1* | 11/2018 | Upadhyay | F01N 9/007 |
| 2019/0322174 A1 | 10/2019 | Koebler et al. | |
| 2020/0258138 A1* | 8/2020 | Ahmed | B60W 40/09 |
| 2020/0318537 A1* | 10/2020 | Salter | F01P 7/04 |
| 2021/0180970 A1* | 6/2021 | Park | B60L 58/13 |

FOREIGN PATENT DOCUMENTS

| | | |
|---|---|---|
| EP | 2826688 A1 | 1/2015 |
| EP | 3626498 A1 | 3/2020 |
| GB | 2550261 A | 11/2017 |
| WO | 2013133791 A1 | 9/2013 |
| WO | 2019209370 A1 | 10/2019 |
| WO | 2020005894 A1 | 1/2020 |

OTHER PUBLICATIONS

International Search Report and Written Opinion of the International Searching Authority for International application No. PCT/EP2021/062780 dated Oct. 5, 2021.

Examination Report under Section 18(3) for Application No. GB2015645.1 dated May 24, 2022.

* cited by examiner

VEHICLE CONTROL SYSTEM

TECHNICAL FIELD

The present disclosure relates to a vehicle control system, in particular a control system for scheduling transient and/or intermittent vehicle actions. Aspects of the invention relate to a control system, to a method, and to a vehicle.

BACKGROUND

Many vehicle systems perform intermittent or transient actions during vehicle operation for a variety of reasons. For example some intermittent actions, such as regeneration procedures for aftertreatment devices within engine exhaust systems, are performed to maintain efficient operation of the vehicle. Meanwhile, transient actions undertaken to account for changing operating conditions may include adjusting the proportion of propulsive power delivered by an electric portion of a hybrid powertrain, or varying a level of reductant added to exhaust gasses in accordance with fluctuations in vehicle load and the ensuing changes to the properties of the exhaust gasses.

Intermittent actions such as regeneration procedures typically increase fuel consumption while the procedure completes, the impact of which may depend on how the vehicle is being operated. For example, a regeneration procedure may have a greater impact on fuel consumption and vehicle emissions if performed during an urban drive cycle involving frequent speed changes, compared with performing the same procedure while the vehicle cruises at a constant speed on a highway. Conversely, delaying a regeneration procedure excessively has an associated performance cost as the device will become saturated and so cease to operate effectively.

Also, if the mode of operation of the vehicle changes such that it can no longer support the procedure before it completes, for example if the vehicle stops, the procedure may have to be aborted and reattempted at a later time, thereby increasing the overall impact of the procedure. For the example of regeneration procedures, frequent, incomplete procedures have the dual disadvantages of a higher average soot load in the device than desired—to the extent that the device is not cleared properly by the partial regeneration procedures—and the increased overall impact on vehicle operation associated with performing the procedures more often.

Transient actions, on the other hand, are most effective when applied in a manner that is complementary to the relevant vehicle operating parameter. For example, selective catalytic reduction (SCR) systems achieve the best results when the level of reductant injected into an exhaust stream substantially corresponds to the level of nitrous oxides or other pollutants present in that exhaust stream, taking into account the various applicable time constants. It follows that any transient action has a corresponding optimal schedule.

Accordingly, for various vehicle actions that are intermittent and/or transient in nature, the timing of the action influences the impact on vehicle operation.

It is against this background that the present invention has been devised.

SUMMARY OF THE INVENTION

Aspects and embodiments of the invention provide a control system, a vehicle, a method, computer software and a non-transitory computer-readable medium as claimed in the appended claims.

According to an aspect of the present invention there is provided a control system for a vehicle, the control system comprising one or more controllers. The control system is configured to: receive at least one identity signal indicative of an identity of a driver of the vehicle; determine a driver profile in accordance with a driver identity indicated by the or each identity signal; estimate a driver intent in accordance with the driver profile; and schedule a vehicle action in accordance with the driver intent.

As different drivers have different driving habits, identifying the individual presently driving the vehicle helps to determine, or predict, how the vehicle is going to be operated. This may include predicting the expected route that the vehicle is about to take, as well as anticipating other factors influenced by the identity of the driver such as the driving style and stopping points along the route. The various elements of the driver's behaviour that impact forthcoming vehicle operation collectively define the driver intent.

By determining the driver intent, namely how the driver intends to operate the vehicle in a forthcoming journey, vehicle actions can be planned to execute at optimal times and/or to follow an optimised schedule in terms of adjustments to relevant operating parameters. For example, an intermittent action such as a regeneration procedure can be scheduled according to the drivers intentions, to ensure that the procedure initiates at a suitable time that allows for the procedure to complete before the vehicle finishes its journey or reaches an expected stopping point. Correspondingly, transient actions can be planned to account for expected operating conditions based on the driver's intentions.

Scheduling vehicle actions based on identifying the driver relies on a certain level of confidence in the identification that has been made and that the determined driver profile is correct. For this reason, the control system may be configured to initiate the scheduled vehicle action only if a confidence level associated with determining the driver profile exceeds a threshold; although it is noted that this does not preclude initiating actions for other reasons. The confidence level threshold may be either implicit or explicit. For example, a confidence level threshold may arise implicitly where there is a requirement for two or more signals indicative of the driver identity to indicate the same driver. Also, certain types of signal may inherently provide the required level of confidence.

The confidence level may be related to characteristics of the, or each, identity signal. For example, a signal indicating the driver identity received from a facial recognition system may be considered more accurate than a signal indicative of the drivers weight received from a seat pressure sensor, to the extent that there is less variation in the respective weights of different drivers than in their facial features.

The confidence level may be related to a degree of consistency of the respective driver identities indicated by multiple identity signals. In this respect, a higher number of corroborating indications of the driver identity provides a correspondingly higher confidence in the driver identity. The control system may be configured to verify a driver identity indicated by one identity signal against a driver identity indicated by one or more other identity signals.

It follows from the above that the nature and number of identity signals can be considered collectively to provide an overall level of confidence in the identification of the driver.

The driver intent optionally comprises an expected vehicle route and/or an expected vehicle destination. In this case, the control system may be configured to schedule the vehicle action in dependence on the expected vehicle route and/or expected vehicle destination.

For example, if the vehicle has a hybrid powertrain, the control system may be configured to identify one or more points with expected high emissions on the expected vehicle route, or areas where emissions are regulated, in which case scheduling the vehicle action may comprise scheduling full or partial electric drive of the vehicle for times when the vehicle will travel through the or each point with expected high and/or regulated emissions. In this way, a charging strategy for a battery of the vehicle can be optimised to reduce vehicle emissions in emissions 'hot spots'.

In addition, the control system may be configured to identify stopping points along the expected vehicle route. Such stopping points can then be taken into account in the scheduling of vehicle actions, for example to avoid having to abort intermittent actions when the vehicle stops.

The control system may be configured to predict an average vehicle speed along the expected vehicle route, further enhancing the ability to plan vehicle actions strategically.

The control system may be configured to receive vehicle data and/or time data, and to estimate the driver intent in accordance with the vehicle data and/or time data. Vehicle data may comprise a location of the vehicle, for example. The vehicle and time data may therefore define a starting point for a vehicle journey, which can be taken into account when determining the driver intent, in particular to determine the expected route and/or destination. For example, if the vehicle data indicates that the vehicle is at a known drivers place of work and the time data corresponds to a time at which that driver usually leaves work, the control system may determine that the destination is likely to be the driver's home.

At least one received identity signal may be a biometric signal indicative of a biometric related to the driver. Such a biometric signal may therefore be indicative of any of: a weight of the driver, for example as indicated by a seat pressure signal; a voice signature, for example as indicated by audio data; and a heart rate, for example as indicated by a signal received from a seatbelt sensor.

The biometric signal may be received from an authentication system, such as a facial recognition system, an ocular scanning system such as a retina scanner, or a fingerprint scanner. Correspondingly, the biometric signal may comprise scan data, which may relate to any one or more of: a fingerprint; a face; and an eye.

The control system may be configured to receive and process a range of types of input signals.

For example, optionally at least one received identity signal comprises data indicative of a driving style, in which case the control system may be configured to monitor the data indicative of the driving style.

In some embodiments, at least one received identity signal comprises data indicative of a driver input to the vehicle. For example, the data indicative of a driver input to the vehicle may comprise any one or more of: a selected seat configuration; an input to an infotainment system; an input to a navigation system; a driving mode selection; an indication of a mirror position; and an indication of a steering wheel position.

Optionally, at least one received identity signal comprises personal data associated with the driver. The personal data may be received from a mobile communications device.

At least one received identity signal may comprise data indicative of a driving route, which may be received from a navigation system, for example.

At least one received identity signal comprises a signal indicative of the presence of a device associated with the driver.

The driver profile may define characteristics of the driver that are indicative of the driver's normal behaviour and so aid in predicting the driver's intent. Accordingly, the driver profile may comprise any one or more of: driving style data; historical journey data, including regular routes, irregular routes and route frequencies; gearing preference data; data related to usage of autonomous features such as cruise control; road line preference data; acceleration characteristics; steady-state speeds; typical fuel consumption, including a traffic correction factor obtained from GPS data; overtaking data, including records of safe overtakes with line assist and also unsafe overtakes; favoured driving modes by location; eco-points, namely a score assigned to an identified driver based on driving style, cabin and suspension settings to categorise the driver as, for example, an 'economy driver', a 'comfort driver', a 'sports driver', an 'off-road driver' or an 'aggressive driver'; and a driver ID.

The control system may be configured to determine the driver profile by selecting a driver profile from a set of stored driver profiles based on the driver identity, each driver profile of the set being associated with a respective driver identity, and optionally multiple driver identities.

A driver profile may characterise the expected behaviour for the driver to which the profile relates as a spectrum of driving behaviour. For example, the driver profile may contain information that will allow the control system to determine whether the driver is operating the vehicle in a manner that is relatively sporty, but within the range of their normal behaviour. Alternatively, it is also possible for multiple driver profiles to be associated with a particular driver, each driver profile relating to a different type of driving behaviour that is known for that driver.

Alternatively, or in addition, the control system may be configured to determine the driver profile by creating a new driver profile, for example if there is no existing driver profile corresponding to the driver indicated by the or each identity signal. In this case, the control system may be configured to add the new driver profile to a set of stored driver profiles, each driver profile of the set being associated with a respective driver identity.

The vehicle action may comprise an engine control strategy. In this respect, an 'engine control strategy' may include strategies for controlling a power distribution in a hybrid powertrain, and strategies for processing engine outputs such as selective catalytic reduction, NOx adsorber catalyst (NSC/LNT/DONAC) and three-way catalyst (TWC) applied to exhaust gas.

The control system may be configured to receive a signal indicative of a demand for the vehicle action, and to schedule the vehicle action in accordance with the driver intent and the demand for the vehicle action. For example, for the case where the vehicle action comprises a regeneration procedure for an aftertreatment device, the control system may take into account the level of saturation of the device when scheduling the next regeneration procedure.

The control system may be configured to predict a vehicle load in accordance with the estimated driver intent, and to schedule the vehicle action in accordance with the predicted vehicle load. This may allow the control system to optimise transient actions in accordance with the predicted vehicle load. For example, the vehicle action may comprise adding a reductant to an exhaust system of the vehicle, in which case the control system is able to plan adjustments to the level of reductant added to exhaust gas based on the predicted properties of the exhaust gas, thereby helping to maintain the reductant at a suitable level as the properties of the exhaust gas vary.

The control system may be configured to output a control signal that is arranged to implement the vehicle action in the relevant vehicle system. Alternatively, the control system may encompass the device or equipment in which the vehicle action is implemented, in which case the control system effects the vehicle action directly.

The vehicle action may comprise any of the following: a regeneration procedure; a NOx adsorber catalyst purge; an exhaust treatment operation and related functions such as modelling soot loading in a particulate filter such as a diesel particulate filter (DPF) or a gasoline particulate filter (GPF); TWC oxygen storage balancing for GPF regeneration; a battery charge strategy; controlling loading of a turbocharger of the vehicle; configuring electric operation, such as managing a power split in a hybrid powertrain; real driving emissions hotspot reduction; on-board diagnostics (OBD) trigger; and operating an energy recovery system of the vehicle.

Regarding OBD triggers, sensors and actuator diagnostics are performed during defined operation modes, for example coasting or steady-state. A change in the operation mode may cause the diagnostic process to fail, leading to increased emissions due to other intrusive actions and many faults from field vehicles. So, in embodiments of the invention OBD triggers can be scheduled for times when they are more likely to complete successfully.

The one or more controllers may collectively comprise: at least one electronic processor having an electrical input for receiving signals indicative of an identity of a driver of the vehicle; and at least one memory device electrically coupled to the at least one electronic processor and having instructions stored therein. In this arrangement, the at least one electronic processor is configured to access the at least one memory device and execute the instructions thereon so as to determine the driver profile, estimate the driver intent in accordance with the driver profile, and schedule the vehicle action.

The invention also extends to a vehicle comprising the control system of the above aspect.

Another aspect of the invention provides a method of operating a vehicle. The method comprises: receiving at least one identity signal indicative of an identity of a driver of the vehicle; determining a driver profile in accordance with a driver identity indicated by the or each identity signal; estimating a driver intent in accordance with the driver profile; and scheduling a vehicle action in accordance with the driver intent.

Further aspects of the invention provide computer software that, when executed, is arranged to perform the method of the above aspect, and a non-transitory, computer-readable storage medium storing instructions thereon that, when executed by one or more electronic processors, causes the one or more electronic processors to carry out the method of the above aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
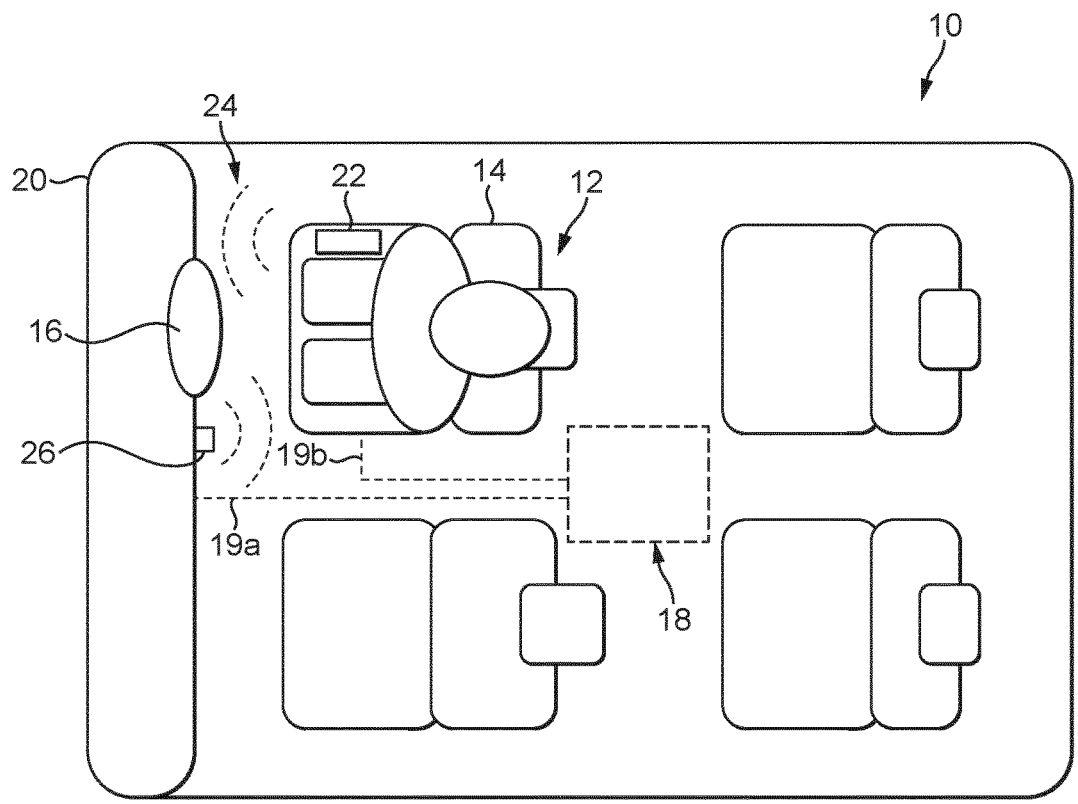
FIG. 1 shows in plan, schematic view a vehicle in which embodiments of the present invention may be implemented.

In general terms, embodiments of the present disclosure provide a vehicle control system that acts to forecast vehicle operation and then plan and schedule transient and/or intermittent vehicle actions accordingly. As the vehicle is operated by a driver, future vehicle operation may be considered to represent a driver intent, to the extent that it reflects the manner in which the driver intends, consciously or unconsciously, to operate the vehicle. The driver intent therefore represents parameters such as the route that the vehicle will take and the manner in which the vehicle will be driven along that route.

Recognising that the driver intent is largely dependent on the identity of the driver, forecasting the driver intent is based on identifying the driver accurately with a high level of confidence. Once identified, the driver is matched with a driver profile, which is a package of data associated with the driver that holds historical data relating to previous occasions on which the driver has driven the vehicle. The driver profile therefore represents information regarding how that driver normally operates the vehicle, which can be used to predict how the driver will operate the vehicle for the forthcoming journey.

It may also be possible to share driving data between vehicles such that the driver profile associated with a particular driver updates each time the driver operates any vehicle. Accordingly, the driver profile need not be restricted to a specific vehicle. For example, the driver profile could be held by a remote server, or by a mobile communications device belonging to the driver.

The driver intent forecasting typically also takes the vehicle location and the time of day into account. For example, the driver profile, vehicle location and time of day may collectively suggest that the driver is about to commence a regular morning commute. On this basis, the control system is able to predict the forthcoming journey.

The driver profile may also provide information relating to the drivers normal driving style, for example whether the driver tends to adopt a more aggressive driving style. Moreover, the driver profile may indicate the drivers normal driving style in specific locations or on certain road types. For example, a driver may tend to drive in a relatively sporty manner on highways, but more economically in urban areas.

The control system can take all of the information provided by the driver profile into account to identify a suitable time and location to initiate an intermittent vehicle action such as a regeneration procedure or a lean NOx trap (LNT) purge. The timing for such actions will take into account the duration of the action to ensure that it completes before the expected end of the vehicle journey. The control system also seeks to schedule such actions for times at which the vehicle will be operating in a manner that minimises the impact of the action. For example, ideally a regeneration procedure is scheduled to occur when the vehicle is cruising at a relatively constant speed, with a high engine load and desired exhaust gas temperature and pressure.

The control system also uses the predicted driver intent to schedule transient vehicle actions such as adjustments to SCR dosing, namely ammonia or urea injection. In this respect, the driver intent is indicative of the future vehicle load, which in turn dictates the future properties of exhaust gas expelled from an engine of the vehicle and therefore the level of SCR dosing required. So, the driver intent can be used to predict and schedule an optimised SCR dosing profile.

It is noted that there is not necessarily a clear distinction between transient and intermittent actions. Whereas some actions, such as SCR dosing, may be considered continuous and therefore entirely transient in certain modes of operation, other operations such as strategies for managing a hybrid powertrain may incorporate both transient and intermittent elements in their implementation.

Some specific intermittent and transient actions for which the knowledge of future vehicle behaviour can be taken into account include:
 DPF and gasoline particulate filter (GPF) regeneration;
 SCR loading control and LNT coordination;
 purge management for NOx adsorber catalysts including LNT, TWC and/or DONAC devices;
 battery state-of-charge (SOC) management for emissions reduction;
 hybrid powertrain management to manage power split for electric propulsion system;
 RDE hot spot reduction;
 Soot loading model;
 OBD trigger; and
 load stabilisation for turbocharger for component protection and to avoid surge.

Some of these examples will be described in more detail later. First, a process by which the driver may be identified to form the basis of a prediction of the driver intent is described with reference to FIGS. 1 and 2.

FIG. 1 shows in schematic form a vehicle 10 in which a driver 12 is seated in a driver's seat 14 behind a steering wheel 16. The vehicle includes a control system 18, represented illustratively in FIG. 1 by dashed lines, that is configured to receive and process signals that are indicative of the identity of the driver 12, or 'identity signals'. In this respect, another dashed line in FIG. 1 represents a line of communication defining a first data channel 19a that extends between the control system 18 and a dashboard 20 of the vehicle 10, through which certain signals identifying the driver 12 are transmitted. A separate, second data channel 19b extends between the control system 18 and the driver's seat 14 to convey further identity signals.

It should be appreciated that the control system 18 and lines of communication represented in FIG. 1 are purely illustrative. In practice the control system 18 may be placed anywhere in the vehicle 10, and may be integrated with other systems. The control system may also be embodied as a distributed system, for example by means of intercommunicating functional modules embedded within existing vehicle systems.

Also, in practice there are likely to be many more lines of communication to the control system 18 to provide identity signals from a wide range of sources within the vehicle 10. FIG. 1 is therefore simplified in this respect. Such lines of communication are typically provided as a network adhering to a relevant communications protocol such as a CAN Bus network, with other options including CANFD, Flexray, Ethernet and SENT networks.

FIG. 1 also shows a mobile communications device 22 associated with the driver 12, which communicates wirelessly with a dashboard-mounted infotainment system (not shown) of the vehicle 10 in a conventional manner. For example, the device 22 may 'pair' with the infotainment system using a Bluetooth® signal 24 to exchange data with the infotainment system.

The vehicle 10 is further equipped with an authentication system that is used to recognise the driver 12 to enable or disable certain functions. In this example the authentication system is a facial recognition system, which is represented in FIG. 1 by a rear-facing scanning device 26 mounted at the front of the vehicle cabin, for example integrated with a rear-view mirror. The scanning device 26 captures image data and/or three-dimensional scan data that can be processed to provide an indication of the identity of the driver 12.

In this embodiment, signals indicative of the drivers identity that may be transmitted from the dashboard 20—or from vehicle systems within or near the dashboard 20—may include signals indicating inputs made by the driver 12 to the infotainment system and/or to a navigational system (not shown), each of which have human-machine interfaces within the dashboard 20. In this respect, selections made by the driver 12 such as a radio station or a driving route are indicative of the driver's identity to the extent that they reflect the drivers preferences and/or habits.

Moreover, an indication of a driving route input to a navigational system is directly indicative of the driver intent, and so the control system 18 uses such signals both to identify the driver 12 and to determine the driver intent.

A further potential indication of the driver intent for an electric vehicle or a plug-in hybrid vehicle may be the SOC of the vehicle battery, noting that the driver 12 may charge the battery to a higher level in anticipation of a longer journey.

It is further noted that the location of the vehicle 10 and/or the time of day may in themselves be indicative of the driver identity. For example, if the vehicle 10 is parked at a place of work of a known driver 12, and a driver 12 then enters the vehicle 10 at a time corresponding to a regular commute home, the vehicle location and time data are strongly suggestive of the driver identity. Moreover, the vehicle location and time can also be used to determine the driver intent, in particular for the case of a regular journey and more generally as this data indicates the starting point for the next journey.

Accordingly, identity signals in the form of vehicle location data and time data are transmitted from the navigational system to the control system 18 through the first data channel 19a.

Further identity signals received from the first data channel 19a may include a signal indicating that the driver's mobile device 22 has paired with the infotainment system. Such signals can include an identifier associated with the device 22, which in turn identifies the driver 12 indirectly.

Alternatively, if it is not possible to identify the device 22 directly, the device 22 may be identified indirectly using personal data received by the infotainment system from the device 22, including music playlists, contacts or calendar data for example.

As is conventional, the position of the steering wheel 16 can be adjusted to suit the driver 12 and thus reflects the driver's preferences and, to some extent, the drivers physical attributes. Accordingly, a signal indicating the position of the steering wheel 16 is transmitted to the control system 18 through the first data channel 19a to provide a further indication of the driver's identity.

The control system 18 also uses signals that are indicative of a driving style adopted by the driver 12 to help in the identification process. In this respect, signals indicative of the positions of accelerator and braking pedals are sent to the control system 18 through the first data channel 19a. Further signals indicative of the driving style that may be sent to the control system 18 include indications of a selected gear and/or a selected driving mode.

Finally, scan data—or the output of the processing of such scan data—from the facial recognition system may also be transmitted to the control system 18 through the first data channel 19a. Such scan data may be considered a biometric signal as it provides biometric data relating to the driver 12, specifically data relating to the drivers facial features. The vehicle 10 may also be equipped with other authentication systems that are not shown in FIG. 1 that provide different forms of biometric signals, including fingerprint or retina scanning systems and voice recognition systems.

Further signals that are indicative of the drivers identity are transmitted along the second data channel 19b. These include further indications of the drivers preferences, such as a selected seat configuration, as well as further biometric signals. Such biometric signals may include: an indication of the driver's heartrate, for example as indicated by a heartrate sensor embedded in a seatbelt attached to the drivers seat 14; and an indication of the drivers weight as measured by a pressure sensor in a seat cushion of the drivers seat 14.

The skilled reader will appreciate that the identity signals in the example shown in FIG. 1 are by no means exhaustive, and a wide range of signals may be used in this respect.

Indeed, the fact that the driver 12 has accessed the vehicle 10 is usually indicative of their identity to some extent. For example, typically only a small number of people drive a vehicle 10, and so the driver 12 is likely to be one of those people.

For vehicles 10 that are operated as shared vehicles, for example as rental vehicles, details of the driver identity may be available from payments made to use to vehicle 10, for example via a payment app. In such arrangements, if a driver uses a particular vehicle on multiple occasions it will be possible to develop an associated driver profile. Also, it may be possible to create a centralised driver profile that is shared between multiple vehicles, such that a driver associated with a centralised profile can be identified if they operate any of the vehicles having access to the profile.

In summary, the control system 18 harvests data from a wide range of sources to build a picture of the driver identity with increasing fidelity. The level of confidence in the identification of the driver is therefore closely associated with the number of corroborating indications of the driver identity. Equally, conflicting indications of the driver identity reduce the confidence in the identification and so deter the scheduling of vehicle actions based on such an identification.

It is noted that the control system 18 may not literally identify the driver 12 in the sense of determining the driver's name, for example. Accordingly, in the broadest sense references in this disclosure to identifying the driver 12 should be interpreted as meaning matching a driver 12 with a driver profile.

It is also noted that each type of identity signal will have an associated inherent fidelity in terms of how reliably and accurately it indicates the driver identity. For example, the output of the facial recognition system may be considered to provide a more reliable and accurate indication of the driver identity than a seat configuration selection. Conversely, as a given vehicle is typically only operated by a small number of drivers, indications of driver preferences may be considered to identify which of those drivers currently occupies the drivers seat 14 with reasonable confidence.

The overall confidence level in the identification of the driver 12 is therefore a function of the number of corroborating identity signals and the quality of each of those signals.

When the confidence level for the driver identity is sufficient, it can be used to estimate the driver intent and trigger vehicle actions accordingly. In this respect, a sufficient confidence level may be specified explicitly, for example with reference to a threshold confidence level. Alternatively, a threshold confidence level may arise inherently or implicitly by specifying other criteria for the driver identification, since any indication of the driver identity carries an associated level of confidence.

For example, specifying that vehicle actions may be scheduled on the basis of three or more corroborating indications of the driver identity may be considered to define an inherent threshold confidence level. In another example, the control system 18 may accept either three corroborating signals of a lower quality or two corroborating signals of high quality as the basis to schedule vehicle actions, which also may be considered to define inherent threshold confidence levels.

It will be appreciated that the various signals that may be indicative of the driver identity naturally fall into different categories. In this embodiment, the signals are categorised as: biometric signals; driving style signals; and all other, miscellaneous indications of the driver identity.

Taking this into account, in some embodiments the control system 18 implements a multi-level analysis to determine the driver identity, each level of the analysis involving a respective category of signals, with the outputs from each level being compared with each other to corroborate one another and provide a final determination of the driver identity and therefore the appropriate driver profile. The different levels of the analysis execute as the relevant identity signals become available, and so may overlap to some extent.

For example, while an indication of pairing of the mobile device 22 with the infotainment system may become available before the driver 12 even enters the vehicle 10, signals relating to the driving style only become available once the vehicle 10 is moving; and may only become useful after a significant period of monitoring the driving style. Thus, after initially identifying the driver using biometric signals and other identity signals, driving style signals may be used as a final confirmation of the driver identity.

Accordingly, in such an approach the control system 18 works incrementally towards a final identification of the driver, taking a range of different signals of different types into account. In consequence, the driver identity determined by this process can be considered highly reliable and therefore a suitable basis for determining the driver intent and scheduling vehicle actions.

The miscellaneous indications of the driver identity may originate from a range of sources, but in general terms tend to relate to driver habits and preferences, and other personal data. Such data may include direct inputs to vehicle systems by the driver 12, such as an input to the infotainment system or navigational system, a seat configuration selection and a selected cabin temperature. Data received from the driver's mobile device 22 would also fall into this category.

As noted above, the vehicle location and time of day can also be indicative of the driver identity, and so these also provide early indications of the driver identity in a multi-stage analysis.

Shortly after the driver 12 is seated in the vehicle 10, biometrics start to become available. For example, a signal indicative of the driver's heartrate may be averaged over a short period before it can be considered to provide an indication of the driver identity. The drivers weight as indicated by the seat pressure sensor will typically be available sooner. Signals received from authentication systems such as fingerprint scanners and voice recognition systems often rely on the driver 12 to provide the requisite interaction and so become available at indeterminate times. Facial recognition systems, conversely, can typically scan the driver 12 and provide a corresponding identity signal as soon as the driver 12 is seated.

It is noted that in some cases biometric data may become available earlier, and potentially before the driver 12 even enters the vehicle 10. For example, an external facial recognition system may identify the driver 12 as they approach the vehicle 10. Accordingly, biometric signals and other early indications of the driver identity may overlap.

In other embodiments, the control system 18 may not distinguish between different types of signal, and may simply process all available data in parallel to identify the driver. It may even be possible for the control system 18 to identify the driver 12 with sufficient confidence based on a single identity signal in addition to the known vehicle location and time of day, perhaps also taking into account how the driver 12 has unlocked or otherwise accessed the vehicle 10. Moreover, the control system 18 may apply different confidence thresholds for different actions.

However the control system 18 reaches a final identification of the driver 12 with a sufficient level of confidence, the next step is to determine the driver intent and schedule vehicle actions accordingly. This process is summarised in FIG. 2.

Figure 2:
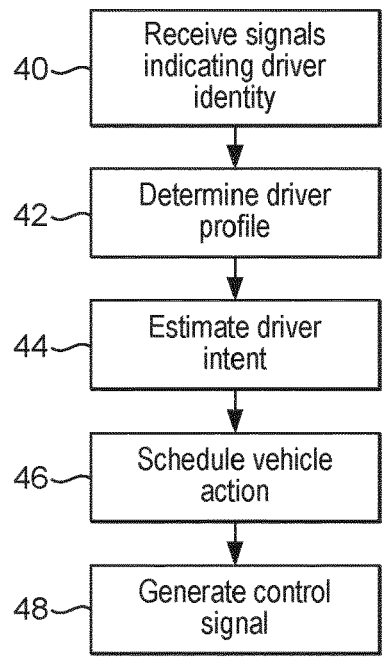
FIG. 2 shows a process according to an embodiment of the invention for scheduling actions in the vehicle of FIG. 1.

As FIG. 2 shows, the control system 18 receives at step 40 one or more signals that are indicative of the driver identity, as described above. The control system 18 processes all received identity signals to match at step 42 the driver identity indicated by the signals with a driver profile, namely a package of data specific to a particular driver that is stored among a set of such packages and that contains information relating to the drivers normal behaviour that may be used to predict what the driver 12 is about to do, namely the driver intent.

If there is no driver profile corresponding to the driver 12 indicated by the incoming signals, a new profile is created and updated with driving style data as the journey progresses, for use in determining the drivers intent the next time that particular driver uses the vehicle 10. In the absence of past driving data relating to the new driver 12, the control system 18 may still be able to estimate the driver's intent, albeit with lower confidence, if navigational data is available from input to the navigational system for example. In this case, the control system 18 may use data from other driver profiles to approximate the driver intent.

Once the appropriate driver profile has been determined, the control system 18 determines at step 44 the driver intent. As already alluded to, this involves processing past driver behaviour as indicated by the driver profile for the present vehicle context, in particular the vehicle location and the time of day. The driver intent that is output from this stage of the process may be expressed as a predicted route and/or destination for the vehicle 10, for example. The driver intent may further include a predicted driving style that, if the data contained in the driver profile allows, may be resolved by location to indicate how the driver 12 is expected to operate the vehicle 10 at each point along the expected route.

With the driver intent established, for example the predicted route, the control system 18 then schedules at step 46 one or more vehicle actions based on that driver intent. The manner in which actions are scheduled will vary according to the nature of the action for reasons already explained. In summary, intermittent actions are scheduled to occur at optimal points along the expected route, taking into account any stopping points, traffic conditions and the expected driving style. Transient actions, on the other hand, may commence immediately, in which case scheduling the action refers to scheduled adjustments to the relevant operating parameter(s) based on the predicted route. Such a schedule may therefore be substantially continuous. This may entail preparing the vehicle for a predicted change in external conditions, for example to charge a vehicle battery in advance of driving through a controlled emissions zone to support increased electric operation when lower emissions are required. Alternatively, it may entail using the driver intent to improve a continuous process, such as adjusting a level of reductant that is added to exhaust gas.

In some embodiments the control system 18 may comprise the equipment or components in which the vehicle action is implemented. In such circumstances, the control system 18 can implement the scheduled vehicle action directly by operating the equipment as required. However, in this embodiment the control system 18 is represented as a separate, dedicated controller that is provided for the purpose of processing identity signals to derive a schedule for vehicle actions. Accordingly, the control system 18 generates a control signal in accordance with the schedule that has been determined for each vehicle action, and outputs that control signal to the relevant vehicle system(s) to be implemented at the appropriate time(s).

The control system 18 may transmit each control signal immediately and defer responsibility for implementing the schedule to the relevant vehicle system. Alternatively, the control system 18 may retain responsibility for the timing of the actions, in which case it outputs a control signal in the form of a request to perform the relevant action at the time when that action is required.

Figure 3:
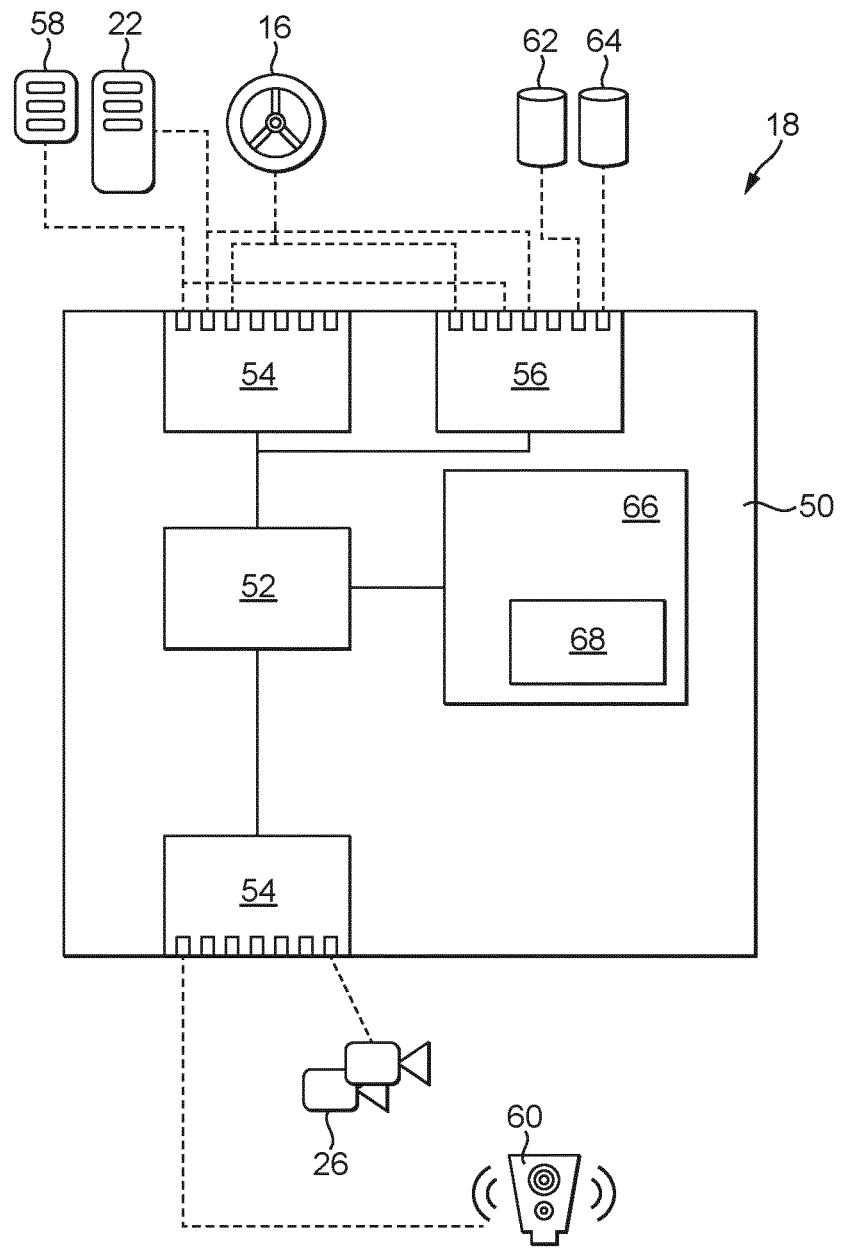
FIG. 3 shows a control system according to an embodiment of the invention for performing the process of FIG. 2 in the vehicle of FIG. 1.

With reference now to FIG. 3, the architecture of the control system 18 is illustrated in simplified form. The control system 18 comprises one or more controllers 50, each of which can comprise a control unit or computational device having one or more electronic processors (e.g., a microprocessor, a microcontroller, an application specific integrated circuit (ASIC), etc.), and may comprise a single control unit or computational device. Alternatively, different functions of the or each controller 50 may be embodied in, or hosted in, different control units or computational devices.

As used herein, the terms 'controller', 'control unit', or 'computational device' will be understood to include a single controller, control unit, or computational device, and a plurality of controllers, control units, or computational devices collectively operating to provide the required control functionality.

A set of instructions could be provided which, when executed, cause the controller 50 to implement the control techniques described herein (including some or all of the functionality required for the method described herein). The set of instructions could be embedded in said one or more electronic processors of the controller 50. Alternatively, the set of instructions could be provided as software to be executed in the controller 50.

A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 3, the controller 50 comprises an electronic processor 52 having one or more electrical input(s) 54 for receiving one or more input signal(s), and one or more electrical output(s) 56 for outputting one or more output signal(s).

As already described above, input signals may be received from a range of sources, for example: a camera 26 forming part of a facial recognition system; a steering wheel 16; a mobile device 22; a seat controller 58 and an infotainment system 60. Accordingly, the input signals comprise data that is indicative of the driver identity.

Output signals may be sent to, for example, an aftertreatment device 62, or an injection device 64 associated with an SCR system. Such output signals may comprise control signals configured to adjust operation of the relevant vehicle sub-systems.

It is noted that all or most units being controlled by the controller 50 may additionally comprise sensors for monitoring their status. Such sensors may be electrically coupled to one or more input(s) 54 of the controller 50, and further control procedures may be partly based on the input of such sensors.

While FIG. 3 shows a controller with separate electrical inputs and outputs 54, 56, input and output connections may be combined in I/O units. It is further noted that some or all communication may be wired or wireless.

The or each controller 50 further comprises at least one memory device 66 electrically coupled to the at least one electronic processor 52 and having instructions 68 stored therein. The at least one electronic processor 52 is configured to access the at least one memory device 66 and execute the instructions 68 thereon so as to analyse the incoming signals to schedule vehicle actions based on predicted driver intent.

The, or each, electronic processor 52 may comprise any suitable electronic processor (e.g., a microprocessor, a microcontroller, an ASIC, etc.) that is configured to execute electronic instructions. The, or each, electronic memory device 66 may comprise any suitable memory device and may store a variety of data, information, threshold value(s), look-up tables or other data structures, and/or instructions therein or thereon. In an embodiment, the memory device 66 has information and instructions for software, firmware, programs, algorithms, scripts, applications, etc. stored therein or thereon that may govern all or part of the methodology described herein. The, or each, electronic processor 52 may access the memory device 66 and execute and/or use those instructions and information to carry out or perform some or all of the functionality and methodology described herein.

The at least one memory device 66 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 50 have been described comprising at least one electronic processor 52 configured to execute electronic instructions stored within at least one memory device 66, which when executed causes the electronic processor(s) 52 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

Figure 4:
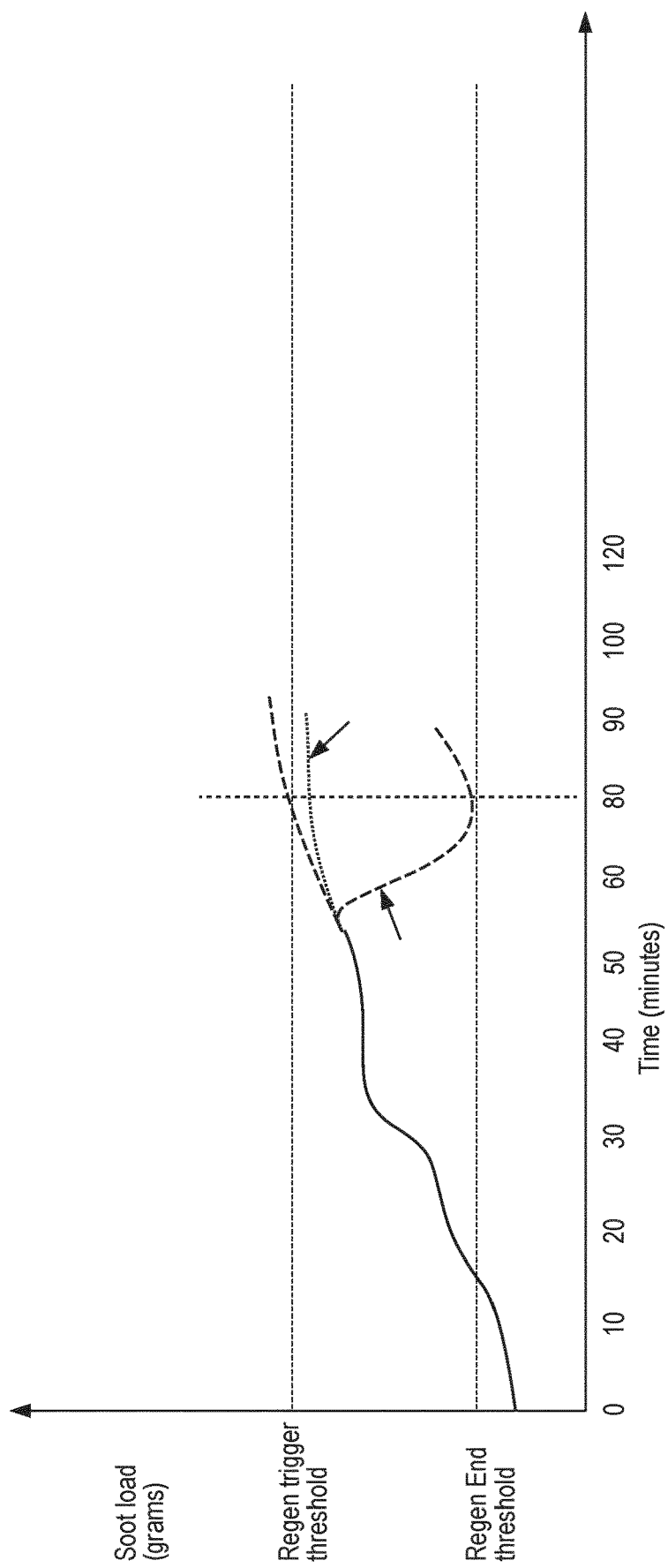
FIG. 4 is a time chart illustrating a regeneration process for an aftertreatment device of the vehicle of FIG. 1.
Figure 5:
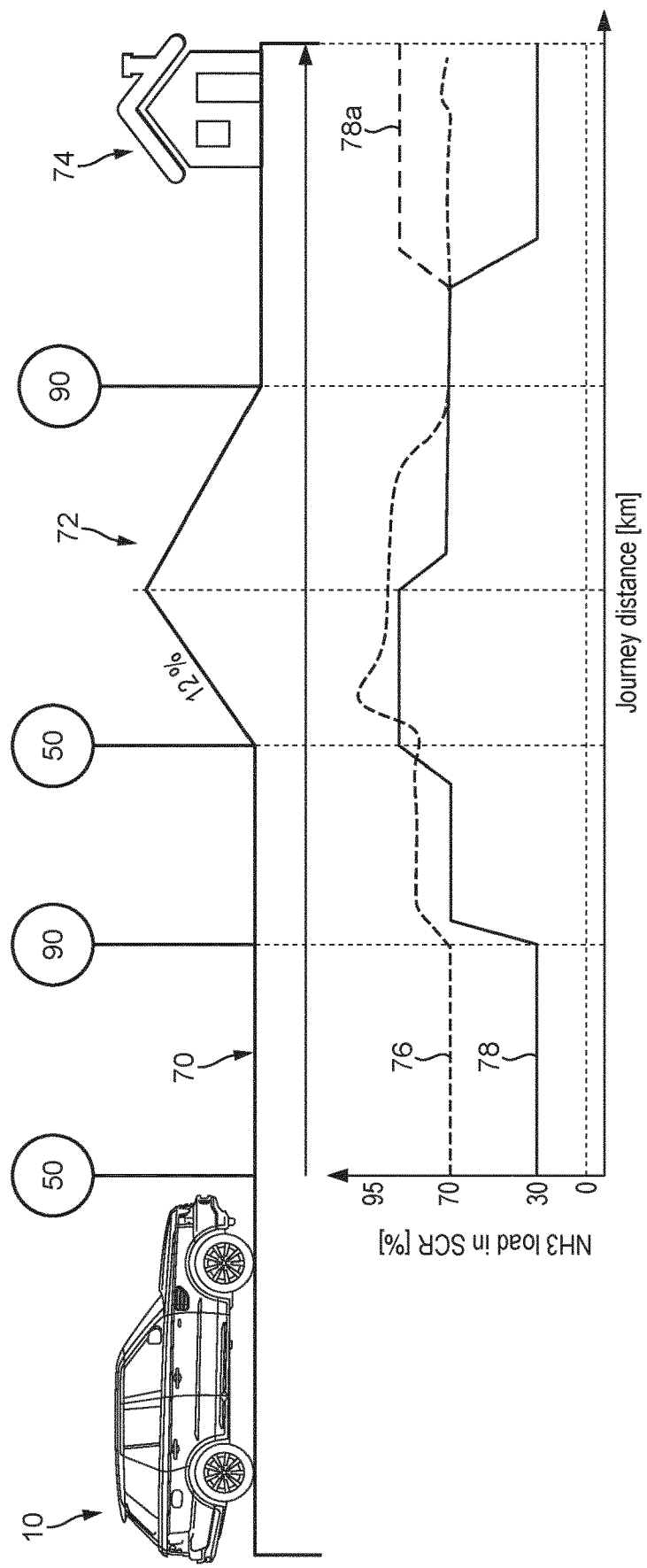
FIG. 5 represents a vehicle journey in which predictive exhaust gas treatment is applied in accordance with the invention.

FIGS. 4 and 5 illustrate use cases for the above described process of scheduling vehicle actions. FIG. 4 relates to an intermittent vehicle action, namely a regeneration procedure for a particulate filter such as a DPF or GPF, while FIG. 5 relates to a transient action, namely loading exhaust gas with a reductant.

Starting with FIG. 4, the graph shows a soot loading of a DPF over the course of a vehicle journey lasting 80 minutes, with the end of the vehicle journey being indicated by a vertical dashed line. FIG. 4 also shows a pair of horizontal dashed lines that represent thresholds relating to regeneration procedures. Specifically, a lower dashed line of the pair corresponds to a soot loading at which a regeneration procedure ends, which is therefore an acceptable level of soot at which the DPF operates effectively and that allows for a certain level of soot accumulation before a regeneration procedure is required. Correspondingly, the upper horizontal dashed line represents a regeneration trigger threshold, which corresponds to a level of soot at which a regeneration procedure becomes necessary to prevent saturation of the DPF.

Throughout the journey, the control system 18 predicts the future soot loading of the DPF based on the present conditions and the driver intent. In particular, the control system 18 predicts when the journey will end using the techniques described above, and the soot loading in the DPF at the end of the journey assuming that no intervention to burn off the soot takes place. The control system 18 takes into account the expected driving style over the course of the journey and anticipated traffic conditions, as these will influence the rate of soot accumulation in the DPF.

If the modelling performed by the control system 18 indicates that the regeneration trigger threshold will not be exceeded in the present journey, the control system 18 takes no action. Alternatively, if the control system 18 finds that the soot loading will breach the regeneration trigger threshold before the journey ends, the control system 18 will schedule a regeneration procedure such that the procedure completes before the journey ends. This will entail triggering the regeneration procedure before the regeneration trigger threshold is breached, as explained further below.

FIG. 4 shows in a solid black line the profile of the soot loading up to approximately 55 minutes into the journey. At that point, the solid line is replaced by three dashed lines extending for the remainder of the journey, which represent the different possibilities.

The middle dashed represents the situation where the soot loading will not exceed the regeneration trigger threshold before the journey ends. As noted above, in this case the control system 18 takes no action.

The uppermost dashed line represents a situation in which the soot loading would breach the regeneration trigger threshold. Notably, the breach occurs only a short time before the journey is due to end. In this case, the control system 18 intervenes and initiates a regeneration procedure over 20 minutes before the regeneration trigger threshold is expected to be breached, to allow time for the procedure to complete before the journey ends. The soot loading profile that arises from this is represented by the lowermost dashed line, which shows how the soot loading drops sharply as soot is burnt off during the procedure. This line also indicates that the soot loading levels off and begins to rise again on reaching the soot loading level at which regeneration procedures are arranged to terminate, indicating that the procedure has completed successfully before the end of the journey.

Moving on to FIG. 5, the vehicle 10 is represented traversing a road 70 that has varying speed restrictions and a hill 72, at the end of which lies the destination, namely the drivers home 74. Below the representation of the road 70, a graph includes two parallel plots of an ammonia load that is applied throughout the journey by an SCR system: a first plot 76 corresponding to conventional operation, shown in a dashed line; and a second plot 78, shown as a solid line, corresponding to a technique according to an embodiment of the invention in which the ammonia load is controlled according the predicted properties of the exhaust gas based on the driver intent determined by the control system 18.

Starting with the first plot 76 corresponding to conventional operation, in an initial phase of the journey in which the vehicle 10 travels at 50 kph, the ammonia load has a relatively high starting point, at around 70% ammonia load. In the absence of information regarding forthcoming changes in exhaust properties, this is necessary to ensure that there is sufficient ammonia loading to cope with sudden changes in exhaust properties, taking into account the time constant for the SCR system. Then, the vehicle speed rises to 90 kph, which prompts the ammonia load to ramp up to a higher level, which is then held steady until the next change in vehicle operating parameters.

The next change in ammonia loading arises when the vehicle 10 encounters the hill 72, which coincides with the vehicle 10 decelerating to 50 kph. This manifests initially as a drop in the ammonia loading corresponding to the vehicle speed decrease, before the ammonia loading rises sharply due to the increased vehicle load caused by ascending the hill 72, and the associated impact on the exhaust gas. The ammonia load remains high until some time after the vehicle 10 passes the summit of the hill 72 and begins its descent, which again results from feedback relating to the properties of the exhaust gas as they change in view of the reduced vehicle load. This portion of the journey therefore demonstrates how the conventional system operates in a reactive, and therefore non-optimised manner.

After passing the hill 72, the vehicle 10 continues at a steady speed until reaching the drivers home 74. During this time, the ammonia load is held at the minimum level of approximately 70%.

Turning now to the second plot 78 showing the predictive approach, various differences with the conventional plot are immediately apparent.

Firstly, the initial ammonia loading for the second plot 78 is much lower than for the first plot 76, reflecting the fact that the control system 18 has predicted when the next change in exhaust gas properties will arise and so can take the opportunity to reduce ammonia consumption in the meantime.

Another notable difference corresponds to the period during which the vehicle 10 negotiates the hill 72. Whereas the conventional approach is reactive during this time, the second plot 78 exhibits predictive qualities. For example, the ammonia loading ramps up before the vehicle 10 reaches the hill 72 in anticipation of the rise in vehicle load, so that the SCR system is operating at the appropriate level when the vehicle begins to climb the hill 72. The ammonia loading then starts to ramp down immediately when the vehicle 10 passes the summit, the load then steadying quickly at a level that is suitable for the descent.

Finally, although the first and second plots 76, 78 initially take the same value for the final portion of the journey, as the control system 18 is able to predict that the journey is to end soon it reduces the ammonia loading accordingly, which is reflected in the second plot by a drop to 30% loading for the final part of the journey.

FIG. 5 also shows a third plot 78a representing an alternative control strategy in which the ammonia loading is increased in the final portion of the journey, not decreased as described above. This applies to situations in which the vehicle 10 is expected to commence another journey shortly after the present journey ends, especially if high load is expected in the next journey. For example, if the destination is a motorway service station instead of the drivers home 74, it can be expected that vehicle 10 will shortly be operated again, and moreover will be operated a high load. Increasing the ammonia loading at the end of the journey in this way prepares the vehicle 10 for the next journey so that NOx conversion will be effective from an early stage.

In deciding how to control the ammonia loading in the final stage of the journey, the control system 18 also takes into account the time of day and other factors that may indicate how long the vehicle 10 may be expected to be inactive.

For example, even where the destination is a motorway service station, if the stop occurs around lunchtime a longer wait may be expected until vehicle operation resumes. The drivers usual driving patterns will also inform this decision.

In general terms, the control system 18 increases ammonia loading in the final portion of the journey if the vehicle 10 is expected to be driven again before the SCR system temperature falls below a threshold. For example, for an SCR system configured to operate in a range of 250-300° C. in normal conditions, the control system 18 may apply a threshold of 180° C. Taking into account also the ambient temperature and the expected cooling curve for the SCR system, the control system 18 determines whether the SCR system temperature will fall below 180° C. before the vehicle is expected to be reactivated. Typically, the SCR system temperature might be expected to fall below the threshold after the vehicle 10 has been inactive for approximately 30 minutes.

If the temperature is expected to be above the threshold when the vehicle 10 is reactivated, ammonia loading is increased in the final part of the journey. Conversely, ammonia loading is reduced in the final part of the journey if the SCR system temperature is expected to be below the threshold temperature by the time the vehicle 10 is next driven, because the benefit of increased ammonia loading would be lost by the cooling of the SCR system in this case.

Accordingly, the benefits of the predictive approach for the transient action represented in FIG. 5 are clear, in that the control system 18 is able to conserve ammonia at times of steady-state operation, whilst also preparing the system in advance when conditions change, ensuring that the ammonia load is optimised at all times.

It will be appreciated that various changes and modifications can be made to the present invention without departing from the scope of the present application.

It should also be appreciated that the two use cases provided in FIGS. 4 and 5 are only examples, and many further use cases are possible within the scope of the present application, including any of the specific vehicle actions listed above.

Aspects of the invention are described in the following numbered clauses:

1. A control system (18) for a vehicle (10), the control system (18) comprising one or more controllers (50), the control system (18) being configured to:
   receive at least one identity signal indicative of an identity of a driver (12) of the vehicle (10);
   determine a driver profile in accordance with a driver identity indicated by the or each identity signal;
   estimate a driver intent in accordance with the driver profile; and
   schedule a vehicle action in accordance with the driver intent.
2. The control system (18) of clause 1, configured to initiate the vehicle action only if a confidence level associated with determining the driver profile exceeds a threshold.
3. The control system (18) of clause 2, wherein the confidence level is related to characteristics of the or each identity signal.
4. The control system (18) of clause 2 or clause 3, wherein the confidence level is related to a degree of consistency of the respective driver identities indicated by multiple identity signals.
5. The control system (18) of any preceding clause, configured to verify a driver identity indicated by one identity signal against a driver identity indicated by one or more other identity signals.
6. The control system (18) of any preceding clause, wherein the driver intent comprises an expected vehicle route and/or an expected vehicle destination.
7. The control system (18) of clause 6, configured to identify one or more points with expected high emissions on the expected vehicle route.
8. The control system (18) of clause 7, wherein scheduling the vehicle action comprises scheduling full or partial electric drive of the vehicle (10) for times when the vehicle (10) will travel through the or each point with expected high emissions.
9. The control system (18) of any of clauses 6 to 8, configured to identify stopping points along the expected vehicle route.
10. The control system (18) of any of clauses 6 to 9, configured to predict an average vehicle speed along the expected vehicle route.
11. The control system (18) of any of clauses 6 to 10, configured to schedule the vehicle action in dependence on the expected vehicle route and/or expected vehicle destination.
12. The control system (18) of any preceding clause, configured to receive vehicle data and/or time data, and to estimate the driver intent in accordance with the vehicle data and/or time data.
13. The control system (18) of clause 12, wherein the vehicle data comprises a location of the vehicle (10).
14. The control system (18) of any preceding clause, wherein at least one received identity signal is a biometric signal indicative of a biometric related to the driver.
15. The control system (18) of clause 14, wherein at least one biometric signal comprises data indicative of a weight of the driver (12).
16. The control system (18) of clause 15, wherein the biometric signal indicative of a weight of the driver (12) comprises a seat pressure signal.
17. The control system (18) of any of clauses 14 to 16, wherein at least one biometric signal comprises data indicative of a voice signature.
18. The control system (18) of clause 17, wherein the biometric signal indicative of a voice signature comprises audio data.
19. The control system (18) of any of clauses 14 to 18, wherein at least one biometric signal comprises data indicative of a heart rate.
20. The control system (18) of clause 19, wherein the biometric signal indicative of a heart rate is received from a seatbelt sensor.
21. The control system (18) of any of clauses 14 to 20, wherein the biometric signal is received from an authentication system (26).
22. The control system (18) of any of clauses 14 to 21, wherein the biometric signal comprises scan data.
23. The control system (18) of clause 22, wherein the scan data relates to any one or more of: a fingerprint; a face; and an eye.
24. The control system (18) of any preceding clause, wherein at least one received identity signal comprises data indicative of a driving style.
25. The control system (18) of clause 24, configured to monitor the data indicative of the driving style.
26. The control system (18) of any preceding clause, wherein at least one received identity signal comprises data indicative of a driver input to the vehicle (10).
27. The control system (18) of clause 26, wherein the data indicative of a driver input to the vehicle (10) comprises any one or more of: a selected seat configuration; an input to an infotainment system (60); an input to a navigation system; a driving mode selection; an indication of a mirror position; and an indication of a steering wheel position.
28. The control system (18) of any preceding clause, wherein at least one received identity signal comprises personal data associated with the driver.
29. The control system (18) of clause 28, wherein the personal data is received from a mobile communications device (22).
30. The control system (18) of any preceding clause, wherein at least one received identity signal comprises data indicative of a driving route.

31. The control system (18) of any preceding clause, wherein at least one received identity signal comprises a signal indicative of the presence of a device associated with the driver (12).

32. The control system (18) of any preceding clause, wherein the driver profile comprises any one or more of: driving style data; historical journey data; gearing preference data; data related to usage of autonomous features; road line preference data; fuel consumption data; and a driver ID.

33. The control system (18) of any preceding clause, configured to determine the driver profile by selecting a driver profile from a set of stored driver profiles based on the driver identity, each driver profile of the set being associated with a respective driver identity.

34. The control system (18) of any preceding clause, configured to determine the driver profile by creating a new driver profile.

35. The control system (18) of clause 34, configured to add the new driver profile to a set of stored driver profiles, each driver profile of the set being associated with a respective driver identity.

36. The control system (18) of any preceding clause, wherein the vehicle action comprises an engine control strategy.

37. The control system (18) of any preceding clause, configured to receive a signal indicative of a demand for the vehicle action, and to schedule the vehicle action in accordance with the driver intent and the demand for the vehicle action.

38. The control system (18) of any preceding clause, configured to predict a vehicle load in accordance with the estimated driver intent, and to schedule the vehicle action in accordance with the predicted vehicle load.

39. The control system (18) of clause 38, wherein the vehicle action comprises adding a reductant to an exhaust system of the vehicle (10).

40. The control system (18) of any preceding clause, configured to output a control signal that is arranged to implement the vehicle action.

41. The control system (18) of any preceding clause, wherein the vehicle action comprises any of the following: a regeneration procedure for an aftertreatment device; a NOx adsorber catalyst purge; three-way catalyst oxygen storage balancing for GPF regeneration; an exhaust treatment; a battery charge strategy; loading a turbocharger of the vehicle (10); configuring electric operation; real driving emissions hotspot reduction; triggering on-board diagnostics; and operating an energy recovery system of the vehicle (10).

42. The control system (18) of any preceding clause, wherein the one or more controllers (50) collectively comprise:
at least one electronic processor (52) having an electrical input (54) for receiving signals indicative of an identity of a driver of the vehicle (10); and
at least one memory device (66) electrically coupled to the at least one electronic processor (52) and having instructions stored therein;
wherein the at least one electronic processor (52) is configured to access the at least one memory device (66) and execute the instructions thereon so as to determine the driver profile, estimate the driver intent in accordance with the driver profile, and schedule the vehicle action.

43. A vehicle (10) comprising the control system (18) of any preceding clause.

44. A method of operating a vehicle (10), the method comprising:
receiving at least one identity signal indicative of an identity of a driver (12) of the vehicle (10);
determining a driver profile in accordance with a driver identity indicated by the or each identity signal;
estimating a driver intent in accordance with the driver profile; and
scheduling a vehicle action in accordance with the driver intent.

45. Computer software that, when executed, is arranged to perform a method according to clause 44.

46. A non-transitory, computer-readable storage medium storing instructions thereon that, when executed by one or more electronic processors, causes the one or more electronic processors to carry out the method of clause 44.

The invention claimed is:

1. A control system for a vehicle, the control system comprising one or more controllers, the control system being configured to:
receive at least one identity signal indicative of an identity of a driver of the vehicle;
determine a driver profile in accordance with the identity indicated by the at least one identity signal;
estimate a driver intent in accordance with the driver profile, wherein the driver intent is a prediction of a route that the vehicle will take, and the prediction is determined from the identity of the driver; and
schedule a vehicle action in accordance with the driver intent.

2. The control system of claim 1, wherein the control system is configured to initiate the vehicle action only if a confidence level associated with determining the driver profile exceeds a threshold.

3. The control system of claim 2, wherein the confidence level is related to characteristics of the at least one identity signal.

4. The control system of claim 2, wherein the confidence level is related to a degree of consistency of the respective driver identities indicated by multiple identity signals.

5. The control system of claim 1, wherein the control system is configured to verify a driver identity indicated by one identity signal against a driver identity indicated by one or more other identity signals.

6. The control system of claim 1, wherein the driver intent comprises an expected vehicle route and/or an expected vehicle destination.

7. The control system of claim 6, wherein the control system is configured to identify at least one point with expected high emissions on the expected vehicle route.

8. The control system of claim 7, wherein scheduling the vehicle action comprises scheduling full or partial electric drive of the vehicle for times when the vehicle will travel through the at least one point with expected high emissions.

9. The control system of claim 6, wherein the control system is configured to identify stopping points along the expected vehicle route.

10. The control system of claim 6, wherein the control system is configured to predict an average vehicle speed along the expected vehicle route.

11. The control system of claim 6, wherein the control system is configured to schedule the vehicle action in dependence on the expected vehicle route and/or the expected vehicle destination.

12. The control system of claim 1, wherein the control system is configured to receive vehicle data and/or time data, and to estimate the driver intent in accordance with the vehicle data and/or time data.

13. The control system of claim 12, wherein the vehicle data comprises a location of the vehicle.

14. The control system of claim 1, wherein the at least one identity signal is a biometric signal indicative of a biometric related to the driver.

15. The control system of claim 14, wherein the biometric signal comprises data indicative of a weight of the driver.

16. The control system of claim 14, wherein the biometric signal comprises data indicative of a voice signature.

17. The control system of claim 1, wherein the vehicle action comprises at least one of: a regeneration procedure for an aftertreatment device; a NOx adsorber catalyst purge; three-way catalyst oxygen storage balancing for GPF regeneration; an exhaust treatment; a battery charge strategy; loading a turbocharger of the vehicle; configuring electric operation; real driving emissions hotspot reduction; triggering on-board diagnostics; and operating an energy recovery system of the vehicle.

18. A vehicle comprising the control system of claim 1.

19. A method of operating a vehicle, the method comprising:
   receiving at least one identity signal indicative of an identity of a driver of the vehicle;
   determining a driver profile in accordance with the identity indicated by the at least one identity signal;
   estimating a driver intent in accordance with the driver profile, wherein the driver intent is a prediction of a route that the vehicle will take, and the prediction is determined from the identity of the driver; and
   scheduling a vehicle action in accordance with the driver intent.

20. A non-transitory storage medium containing computer-executable instructions that, when executed by at least one processor, cause the at least one processor to perform the method of claim 19.

* * * * *